US011393317B2

(12) United States Patent
Correnti

(10) Patent No.: US 11,393,317 B2
(45) Date of Patent: Jul. 19, 2022

(54) ENHANCED AUDIOVISUAL ANALYTICS

(71) Applicant: Alarm.com Incorporated, Tysons, VA (US)

(72) Inventor: Matthew Daniel Correnti, Reston, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/060,186

(22) Filed: Oct. 1, 2020

(65) Prior Publication Data

US 2021/0027602 A1 Jan. 28, 2021

Related U.S. Application Data

(63) Continuation of application No. 16/218,986, filed on Dec. 13, 2018, now Pat. No. 10,810,854.

(60) Provisional application No. 62/598,120, filed on Dec. 13, 2017.

(51) Int. Cl.
*G08B 21/02* (2006.01)
*G08B 1/08* (2006.01)
*G08B 21/18* (2006.01)
*G06N 20/00* (2019.01)
*G08B 25/01* (2006.01)

(52) U.S. Cl.
CPC ......... *G08B 21/0297* (2013.01); *G06N 20/00* (2019.01); *G08B 1/08* (2013.01); *G08B 21/182* (2013.01); *G08B 25/012* (2013.01)

(58) Field of Classification Search
CPC .......................... H04N 21/41407; G01S 17/66
See application file for complete search history.

(56) References Cited

U.S. PATENT DOCUMENTS

| 6,850,265 B1 | 2/2005 | Strubbe et al. | |
| 2006/0265195 A1* | 11/2006 | Woodard | G08B 17/10 |
| | | | 702/188 |
| 2012/0320201 A1* | 12/2012 | Boghossian | H04N 7/188 |
| | | | 348/143 |
| 2015/0098613 A1 | 4/2015 | Gagvani et al. | |
| 2016/0103218 A1* | 4/2016 | Mandava | B60Q 5/006 |
| | | | 701/301 |
| 2016/0321506 A1* | 11/2016 | Fridental | H04N 21/4788 |

(Continued)

FOREIGN PATENT DOCUMENTS

WO    WO2008016360    2/2008

*Primary Examiner* — Fabricio R Murillo Garcia
(74) *Attorney, Agent, or Firm* — Fish & Richardson P.C.

(57) ABSTRACT

A monitoring system that is configured to monitor a property includes a camera that is configured to capture video data of the property. The monitoring system further includes a microphone that is configured to capture audio data of the property. The monitoring system further includes a monitor control unit that is configured to access and analyze the video data. The monitor control unit is further configured to determine that an alarm condition does not exist at the property. The monitor control unit is further configured to access and analyze the audio data. The monitor control unit is further configured to override the determination that an alarm condition does not exist at the property. The monitor control unit is further configured to, based on overriding the determination that an alarm condition does not exist at the property, perform a monitoring system action.

20 Claims, 5 Drawing Sheets

(56) References Cited

U.S. PATENT DOCUMENTS

2017/0092089 A1\* 3/2017 Ye ............................ G08B 1/08
2017/0264809 A1  9/2017 Joseph et al.
2018/0276962 A1\* 9/2018 Butler ..................... H04L 67/10

\* cited by examiner

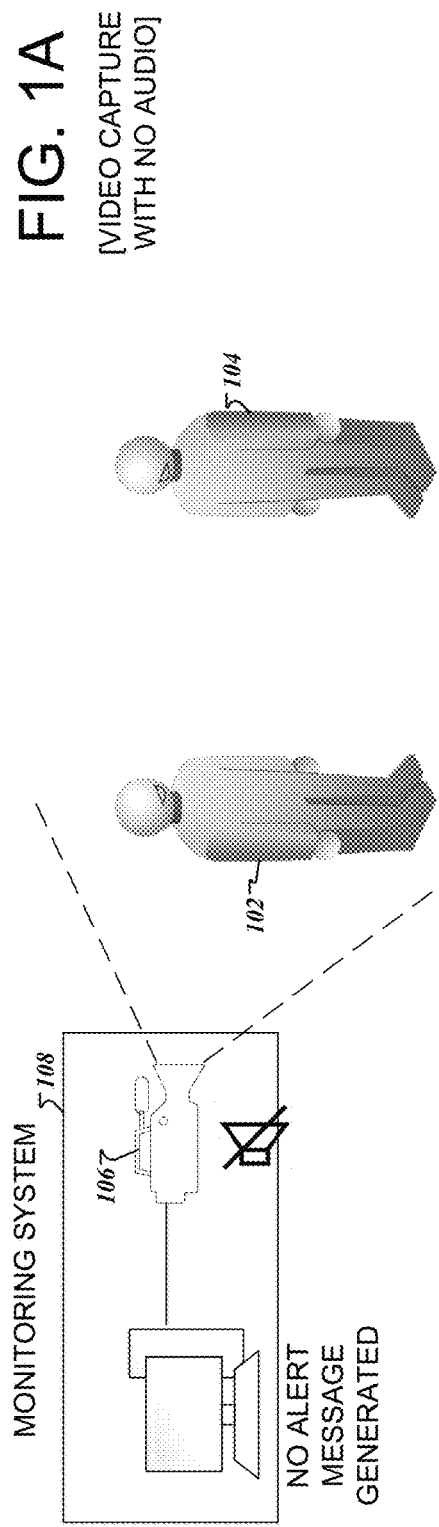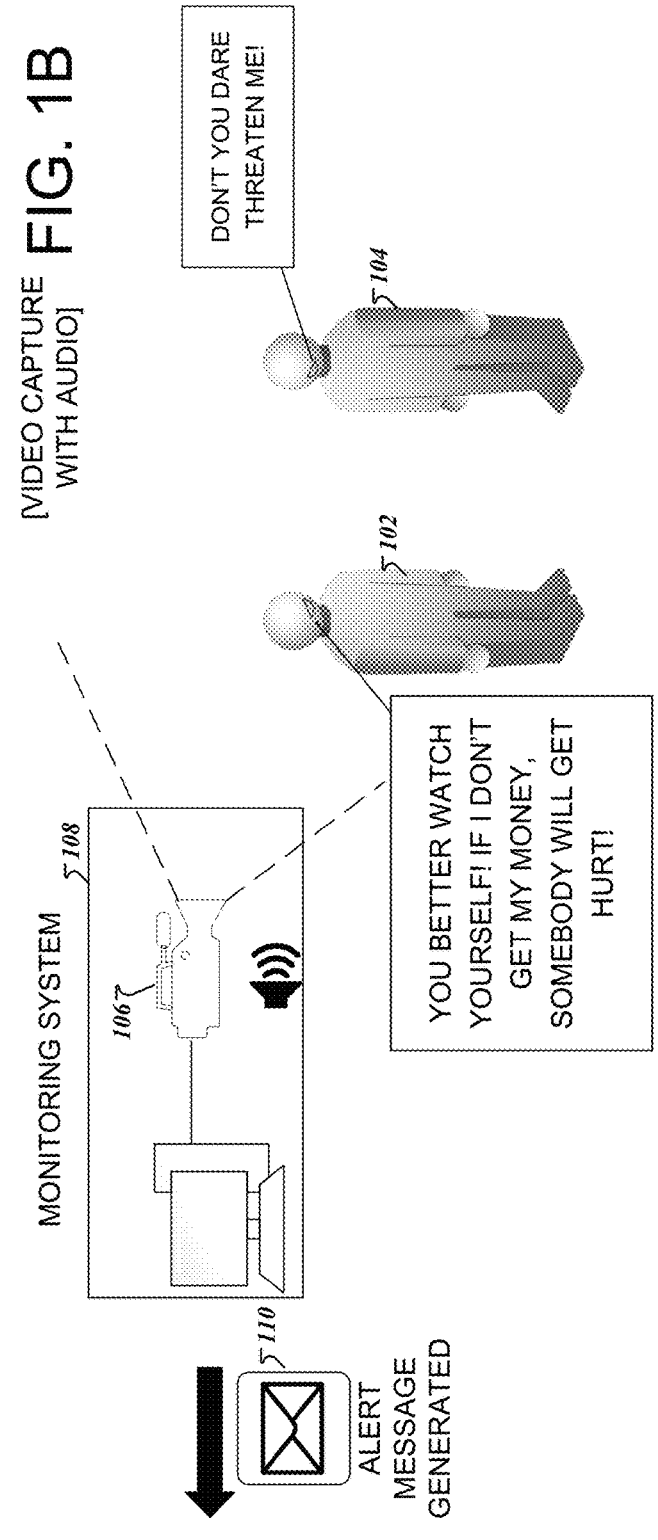

ENHANCED AUDIOVISUAL ANALYTICS

CROSS-REFERENCE TO RELATED APPLICATIONS

This application is a continuation of U.S. patent application Ser. No. 16/218,986, filed Dec. 13, 2018, which claims the benefit of U.S. Provisional Application No. 62/598,120, filed Dec. 13, 2017. The complete disclosures of all of the above patent applications are hereby incorporated by reference in their entirety for all purposes.

TECHNICAL FIELD

This disclosure generally relates to monitoring systems.

BACKGROUND

Security systems often rely on video data to determine potential security threats and events.

SUMMARY

This disclosure generally describes systems and methods for monitoring and identifying security events.

According to implementations, an enhanced audiovisual analytics system, including one or more of a plurality of sensors, a video analytics engine, an audio analytics engine, and neural networks, may be utilized to provide intelligent security alerts and recommendations. By utilizing various audio data classifiers such as a discrete decibel threshold classifier, an average threshold classifier, an escalation classifier, and an audio pattern classifier, the enhanced audiovisual analytics system may identify potential security and safety hazards with a higher degree of accuracy due to the contextual information provided by audio data. Additionally, with the use of neural networks, the enhanced audiovisual analytics system may be deployed in different environments and may be able to adapt and configure itself to its environment using machine-learning techniques.

The implementations described in this specification offer a number of advantages. One advantage is that using audio signal-based triggering saves data storage resources by reducing the reliance on video data, which requires greater storage resources. For example, video monitoring services may not have to be initiated until an audio signal-based trigger is received. Another advantage is that audio signals provide complimentary and supplemental data that provides additional contextual information to video-based monitoring systems.

According to an innovative aspect of the subject matter described in this specification, a system for performing enhanced audiovisual analytics includes a camera that is configured to capture video data of the property; a microphone that is configured to capture audio data of the property; and a monitor control unit that is configured to access and analyze the video data; based on analyzing the video data, determine that an alarm condition does not exist at the property; based on determining that an alarm condition does not exist at the property, access and analyze the audio data; based on analyzing the audio data, override the determination that an alarm condition does not exist at the property; and, based on overriding the determination that an alarm condition does not exist at the property, perform a monitoring system action.

This implementation and other implementation may include one or more of the following optional features. The monitor control unit is configured to analyze the video data by providing the video data as an input to a video model trained to determine whether an alarm condition exists at the property based on video data; and analyze the audio data by providing the audio data as an input to an audio model trained to determine whether an alarm condition exists at the property based on audio data. The monitor control unit is configured to receive labeled video data that includes video data of known alarm conditions and video data without known alarm conditions; train, using machine learning, the video model using the video data of known alarm conditions and the video data without known alarm conditions; receive labeled audio data that includes audio data of known alarm conditions and audio data without known alarm conditions; and train, using machine learning, the audio model using the audio data of known alarm conditions and the audio data without known alarm conditions. The monitor control unit is configured to, after overriding the determination that an alarm condition does not exist at the property, receive data confirming that the alarm condition does exist at the property; and update the video model based on receiving the data confirming that the alarm condition does exist at the property. The monitor control unit is configured to, after overriding the determination that an alarm condition does not exist at the property, receive data confirming that the alarm condition does not exist at the property; and update the audio model based on receiving the data confirming that the alarm condition does not exist at the property.

The monitoring system includes a sensor that is configured to generate sensor data. The monitor control unit is configured to access and analyze the sensor data; and override the determination that an alarm condition does not exist at the property based further on analyzing the sensor data. The monitor control unit is configured to identify the monitoring system action based on the audio data, the video data, and the sensor data. The camera is configured to capture the video data in an area of the property. The microphone is configured to capture the audio data in the area of the property. The monitor control unit is configured to analyze the video data by providing the video data to an object classifier that is configured to identify representations of objects in frames of the video data and to track the objects through preceding or subsequent frames of the video data and to a visual pattern classifier that is configured to identify visual patterns in the frames of the video data and track the visual patterns through preceding or subsequent frames of the video data. The monitor control unit is configured to analyze the audio data by providing the audio data to a discrete decibel threshold classifier that is configured to determine whether the audio data has a signal power greater than a first threshold decibel level, to an average threshold classifier that is configured to compare power of the audio data to a second threshold decibel level over a first period of time, to an escalation classifier that is configured to determine whether an average signal power of the audio data is increasing by a threshold power level over a second period of time, and to an audio pattern classifier that is configured to identify audio patterns in the audio data and track the audio patterns over a third period of time.

Other implementations include corresponding systems, apparatus, computer-readable storage media, and computer programs configured to implement the actions of the above-noted methods.

The details of one or more implementations are set forth in the accompanying drawings and the description below. Other features and advantages will become apparent from the description, the drawings, and the claims.

BRIEF DESCRIPTION OF THE DRAWINGS

FIG. 1A depicts an example scenario in which visual data is used to monitor events.

FIG. 1B depicts an example scenario in which audiovisual data is used to monitor events.

Like reference numbers and designation in the various drawings indicate like elements.

DETAILED DESCRIPTION

Figure 2:
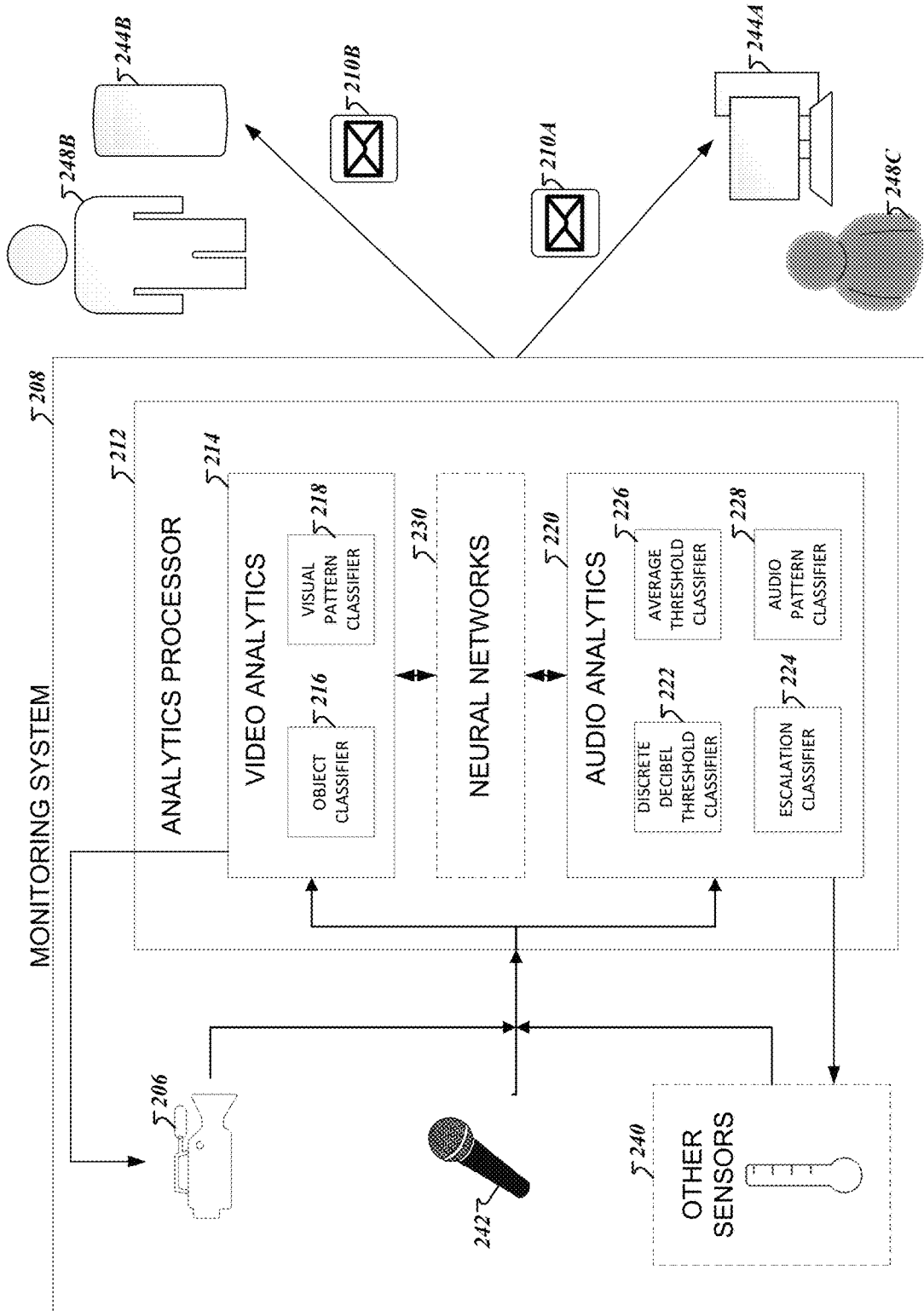
FIG. 2 depicts an example analytics system.

FIG. 1A depicts an example scenario in which visual data is used to monitor events. In FIG. 1A, a monitoring system 108 including a video camera 106 is recording an interaction between two people 102 and 104. The camera 106 does not record any audio data. Video data collected by the camera 106 is transmitted to a processor, server, or computer in the monitoring system 108, which is configured to generate an alarm if any security or safety concerns are triggered based on the data provided by the camera 106. In the scenario depicted in FIG. 1A, the two people 102, 104 can be seen facing each other and talking. The video does not indicate any unusual circumstances or reasons to be concerned. Accordingly, the monitoring system 108 does not generate any alarm or message indicating that the situation involving persons 102, 104 is associated with a safety or security event.

FIG. 1B depicts substantially the same scenario as in FIG. 1A, except in the FIG. 1B scenario, the camera 106 can also obtain audio data through the use of audio sensors such as microphones. The audio sensors may be coupled to or separate from a video camera. The audio sensors are configured to sense audio signals and pick up sounds in the geographical area covered by camera 106. As illustrated in FIG. 1B, the audio sensors can detect the conversation between person 102 and person 104. For instance, person 102 is shouting "YOU BETTER WATCH YOURSELF! IF I DON'T GET MY MONEY, SOMEBODY WILL GET HURT!" at person 104. Person 104 responds by stating "DON'T YOU DARE THREATEN ME!"

The monitoring system 108 may reach a different decision regarding the interaction between person 102 and person 104 based on the additional audio data. For instance, in FIG. 1A, without the benefit of the audio data, the scenario appears as one in which two people are talking to each other. In FIG. 1B, with the benefit of the audio data, the scenario is one in which two people 102, 104 are engaged in a heated argument and the potential for a security threat or event exists. The monitoring system 108 may perform audiovisual analytics on the audiovisual data it has obtained from the camera 106 and use one or more classifiers to determine that the scenario involves a potential security event.

The monitoring system 108 may then execute one or more operations in response to determining that a potential security event exists. As illustrated in FIG. 1B, the monitoring system 108 may generate an alarm message and may send the alarm message to a party, person, or entity who may help defuse the potential security event. For example, a message indicating that an argument is taking place between two people in a store may be sent to a manager of the store so that the manager may intervene or attempt to diffuse the situation.

As can be appreciated from FIGS. 1A and 1B, audio data may provide a security system with contextual information that improves the security system's ability to identify potential security or safety hazards. Although only one scenario is illustrated in FIGS. 1A and 1B, the advantages of obtaining additional contextual information through audio data may be useful in many situations. For example, another scenario may be one in which a camera obtains video footage of a car driving down the street without any audio data. With the benefit of audio data in addition to the video data, the security system may be able to determine if the car is likely harmless, for example, when primarily vehicle engine sounds are detected, or if the car occupants present a potential security or safety hazard, for example, because of loud music, people shouting, or gunshot sounds coming from the vehicle. Additional advantages of the enhanced audiovisual analytics systems are described in the figures and implementations described below.

FIG. 2 depicts an example analytics system such as monitoring system 208, which includes an analytics processor 212, an optical sensor 206 such as a camera, an audio sensor 242 such as a microphone, and additional sensors 240. The analytics processor 212 includes a video analytics engine 214, an audio analytics engine 220, and optionally neural networks 230. The additional sensors 240 may include one or more sensors such as thermometers, motion sensors, humidity and climate sensors, touch sensors, and other audio or visual sensors. Monitoring system 208 may be connected to one or more users 248B via user devices 244B and a monitoring system administrator 248C via administrative device 244A.

In general, the optical sensor 206, audio sensor 242, and additional sensors 240 may detect signals and provide data from the detected signals to the analytics processor 212. For example, the optical sensor 206 may detect optical signals, light signals, or may record still or moving images. An audio sensor 242 may detect sound signals emitted from any source such as a person, device, or object. The other sensors 240 may be variously configured to detect different types of signals. For instance, a humidity sensor may be configured to detect humidity levels in the local environment that the humidity sensor is located in and provide information indicative of the detected humidity levels. Data from the optical sensor 206, audio sensor 242, and additional sensors 240 are provided to analytics processor 212. The optical sensor 206, audio sensor 242, and additional sensors 240 may be configured to operate simultaneously, sequentially, or in any type of order. In some cases, only one type of sensor may be operated at a time.

Sensors 206, 240, and 242 may be deployed or located in different manners. For example, in some cases, sensors 206, 240, and 242 may be located in one area such as a room or building. In some cases, sensors 206, 240, and 242 may be located in different areas such as in different buildings or areas of interest. The sensors 206, 240, and 242 may communicate over a network with the analytics processor 212. In some cases, sensors 206, 240, and 242 may be connected to each other through a wired or wireless network, and may be connected to a system processor such as analytics processor 212.

The video analytics engine 214 may include an object classifier 216 and visual pattern classifier 218. The video analytics engine 214 may receive image data from the optical sensor 206 and additional sensors 240, and preprocess the image data. Preprocessing may include filtering, digitizing, sharpening, brightening, and other image processing techniques for configuring the image data for processing by the object classifier 216 and the visual pattern classifier 218.

The object classifier 216 may include an object detector to identify images of objects in an image or frames of a video and to track the identified objects through preceding or subsequent frames of the video. The object classifier 216 may select identified images having a confidence score that exceeds a threshold value. The confidence score may indicate a likelihood that an identified object is actually an image of the object. The object classifier 216 may track an identified object through other frames to identify additional images of the identified object in a video.

The visual pattern classifier 218 may identify visual patterns in an image or frames of a video and may track the identified patterns through preceding or subsequent frames in the video. The visual patterns may be identified using a pattern detector and neural networks. The visual pattern classifier 218 may select identified visual patterns having a confidence score that exceeds a threshold value. The confidence score may indicate a likelihood that the identified visual pattern is an actual visual pattern. The visual pattern classifier 218 may track an identified visual pattern through other frames to identify additional images of the identified visual pattern in a video.

The audio analytics engine 220 may include a discrete decibel threshold classifier 222, an average threshold classifier 226, an escalation classifier 224, and an audio pattern classifier 228. The audio analytics engine 214 may receive audio data from the audio sensor 242 and additional sensors 240, and preprocess the audio data. Preprocessing may include filtering, subtracting, digitizing, upconverting, downconverting, removing noise, modulating, and other image processing techniques for configuring the audio data for further processing by each of the classifiers 222, 224, 226, and 228 in the audio analytics engine 220.

The discrete decibel threshold classifier 222 may determine whether an audio signal received from the audio sensor 242 or additional sensors 240 has signal power greater than a particular decibel threshold level. The decibel threshold level may be set differently for different environments and/or may be set by an administrator of the monitoring system 208. For example, the decibel threshold level for signals detected by audio sensors located in a mall may be higher than a decibel threshold level for signals detected by audio sensors located in a home. In some cases, the decibel threshold level may be set according to a system or environment status. For example, a decibel threshold level set for a vacant home may be lower than a decibel threshold level set for an occupied home. In general, various system or environment statuses, e.g., occupied, vacant, armed, disarmed, public, private, personal, may be utilized and decibel threshold levels may be customized for each system or environment status.

In some cases, the decibel threshold level may be set or adjusted based on data provided by the neural networks 230. If an audio signal received by audio sensor 242 or additional sensors 240 has signal power greater than the particular decibel threshold level, the audio analytics engine 220 may trigger an alarm operation mode in which an alarm message is generated by the monitoring system 208.

The average threshold classifier 226 may compare the power of an audio signal to a particular decibel threshold level over a particular time period. An average value of the power of the audio signal over the particular time period may be determined by the average threshold classifier 226 and compared to the particular decibel threshold level. If the average power of the audio signal is greater than the particular decibel threshold level, the audio analytics engine 220 may trigger an alarm operation mode in which an alarm message is generated by the monitoring system 208. The decibel threshold level and particular time period may be set differently for different environments, may be set by an administrator of the monitoring system 208, and/or may be set or adjusted based on data provided by the neural networks 230.

The escalation classifier 224 may determine whether the average signal power of an audio signal is increasing by a threshold amount over a particular period of time. The increase in average signal power greater than a threshold amount is determined by the escalation classifier 224 as being representative of an event that is likely to present a safety or security risk. Thus, if the average signal power of an audio signal is determined to increase by a threshold amount over the particular period of time, the audio analytics engine 220 may trigger an alarm operation mode in which an alarm message is generated by the monitoring system 208.

In some implementations, the escalation classifier 224 may utilize two threshold amounts. A first threshold amount or short-term threshold corresponds to a threshold for the average signal power change over a short period of time, e.g., 5 seconds, and a second threshold amount or long-term threshold corresponds to a threshold for the average signal power change over a longer period of time, e.g., 60 seconds. By utilizing two different threshold amounts, the escalation classifier may be able to determine short-term escalations and long-term escalations. In some cases, the escalation classifier 224 may be configured to trigger an alarm operation mode when a certain number of short-term thresholds, e.g., 3 or more, are satisfied. In some cases, the escalation classifier 224 may be configured to trigger an alarm operation mode when a long-term threshold is satisfied.

The audio pattern classifier 228 may identify audio patterns in an audio signal received from audio sensor 242 or additional sensors 240, and may continue to track the identified audio patterns over a period of time. An audio pattern may include, but is not limited to, patterns in pitch, amplitude, and signal frequency peaks. An audio pattern may also correspond to types of sounds such as the sound of trains, buses, airplanes, or ocean waves. A pattern detector in the audio pattern classifier 228 may be provided training data by the neural networks 230 to train the pattern detector on how to detect different types of patterns. The pattern classifier 228 may select identified audio patterns having a confidence score that exceeds a threshold value. The confidence score may indicate a likelihood that the identified audio pattern is an actual audio pattern.

In some implementations, the audio analytics engine 220 may also detect sporadic sounds. An audio signal that is determined by the audio analytics engine 220 not to include an audio pattern by the audio pattern classifier 228 may be further processed by any of the discrete decibel threshold classifier and the pattern classifier 228 to determine if the audio signal includes a signal component corresponding to a particular sound, such as a door knock or a dog bark, that generally occurs over a short period of time. Templates of particular sounds may be stored in a database accessible by the analytics processor 212. Portions of received audio signals may be compared with the templates of particular sounds to determine how much the portions of received audio signals match with the templates of particular sounds, e.g., 87% match. If the portions of received audio signals match with the template of a particular sound and satisfy a matching confidence threshold, the portion of the received audio signal is determined to correspond to a particular sound template.

Neural networks 230 may be trained to facilitate the operations of the video analytics engine 214 and the audio analytics engine 220. For example, the neural networks 230 may obtain labeled images of objects, which can be used as training data for an object detector that detects objects. Labeled images of objects may also be used to train the analytics processor 212 to learn motion primitives or to predict actions in videos. In some implementations, labeled data can be used as training data for a system that predicts the context of a video or image, e.g., where the video or image takes place, the time period the video or image takes place, the circumstances in which the video or image takes place based on the objects that are identified in the video or image.

In some implementations, the neural networks 230 may obtain audio templates or tagged audio data, which can be used as training data for an audio pattern detector that detects audio patterns. The audio templates or tagged audio data may be audio signals that have been tagged as corresponding to certain sounds such as the sound of a barking dog or a vehicle, plane, train, or car passing by. In some implementations, values for the threshold levels and time periods used for processing by classifiers 222, 224, 226, and 228 may be determined by the neural networks 230.

In general, the neural networks 230 may operate according to rules and protocols to detect patterns, settings, and preferences. For example, if the audio sensor 242 is situated in a house located near an airport, the audio sensor 242 may frequently detect sounds of planes landing or taking off. Consequently, the discrete decibel threshold classifier 222 may frequently determine that the power level of audio signals detected by audio sensor 242 satisfy the decibel threshold. However, such an outcome would unnecessarily trigger the alarm mode. The neural networks 230 may detect a pattern of frequency sounds corresponding to the sounds of planes landing or taking off and a homeowner's response of not responding to alarms based on such sound. The neural networks 230 may then determine that audio signals corresponding to sounds of planes landing or taking off should not trigger the alarm mode based on prior homeowner responses. As a result, the neural networks 230 may configure the audio analytics engine 220 not to trigger the alarm mode in response to sounds of planes landing or taking off.

As another example, the neural networks 230 may set a decibel threshold level to be higher for signals received from an audio sensor located in a public facility such as a mall or airport, and may set a decibel threshold level to be lower for signals received from an audio sensor located in a remote facility such as a farm house. In general, various types of machine-learning methods may be applied to train the neural networks 230 and adapt the functionality of the analytics processor 212. For example, feedback or actions taken by a user or system administrator 248C may be used to train the analytics processor 212 for the options or recommendations provided to users, security measures taken by the monitoring system 208, or classifications made by the audio analytics engine 220 or video analytics engine 214.

The analytics processor 212 may obtain classification information from the video analytics engine 214 and the audio analytics engine 220 that includes one or more of an object classification, an identified visual pattern, a detected audio pattern, confidence scores, and any indication of whether a discrete decibel threshold, an average threshold, or an escalation threshold has been satisfied. In addition, if an alarm operation mode is triggered, the analytics processor 212 may generate an alarm message to indicate that there may be a potential security or safety threat at one or more locations where sensors 240, 242, and 206 are deployed. Furthermore, if the alarm operation mode is triggered, the analytics processor 212 may direct sensors 240, 242, and 206 to provide data with an increased frequency for instances in which data from the sensors 240, 242, and 206 is provided periodically and not in real time.

In some implementations, data obtained from the video analytics engine 214 may be utilized to facilitate operations of the audio analytics engine 220 or training of the neural networks 230. In particular, object classification data obtained from the video analytics engine 214 may be utilized to set decibel threshold levels or the selection of audio templates. For example, if an object tracker in the video analytics engine 214 determines that an animal such as a dog or cat is within a field of view of a camera, the video analytics engine 214 may provide data indicating the presence of a dog or cat to the audio analytics engine 220. The audio analytics engine 220 may then set the decibel threshold level or time period utilized by one or more classifiers, such as the average threshold classifier 226, so that an alarm is generated if a detected audio signal exceeds the average decibel threshold level set for a dog or cat over a period of time. In general, various settings, rules, and conditions of the audio analytics engine 220 and/or the neural networks 230 may be adjusted based on data obtained from the video analytics engine 214. The interaction between the audio analytics engine 220, video analytics engine 214, and neural networks 230 may help improve accuracy by reducing instances of false positives or false negatives.

Monitoring system 208 is described in further detail with reference to FIG. 5. Monitoring system 208 may communicate with a system administrator 248C through the administrator's device 244A. The system administrator 248C may configure certain settings and thresholds of monitoring system 208 or analytics processor 212, and may, in general, manage different aspects of monitoring system 208. For example, system administrator 248C may activate one or more sensors 206, 240, and 242 if a user has subscribed to the security service provided by monitoring system 208. In some cases, the system administrator 248C may terminate service for a user if the user opts to discontinue the security service provided by monitoring system 208.

The monitoring system 212 may obtain additional data such as image data, user profile data, time, date, and location information, or any other suitable data to generate a report corresponding to any security or safety alert message received from the analytics processor 212. The report may include one or more images, sounds, location, time and date associated with the security alert, a likely cause of the security alert, and recommendations for actions to take to address the security alert.

In some implementations, monitoring system 208 may transmit an alert message 210A to the system administrator 248C or a user message 210B to a user 248B via user device 244B upon receiving an alert message from the analytics processor. The alert message 210A may include one or more portions of the generated report and may be customized for the systems administrator 248C. For example, the systems administrator 248C may be presented with options for managing one or more system components such as sensors 206, 240, and 242 in the alert message 210A. The user message 210B may include one or more portions of the generated report and may be customized for the user 248B. For example, the user message 2106 may include one or more options to respond to the security alert and the options may be ranked or displayed in an order of preference of the user 248B.

In some implementations, the monitoring system 208 may use the audio analytics engine 220 to identify a gun shot. For example, the audio analytics engine 220 may use a combination of the discrete decibel threshold classifier 222 to detect the high loud pop associated with gun shots. The audio analytics engine 220 may also compare the audio data to patterns of known gun shots using the audio pattern classifier 228. The audio analytics engine 220 may analyze time periods of the audio data that typically correspond to gun shots using the average threshold classifier 226. The audio of a gun shot may have little to no escalation in decibel level. The escalation classifier 224 may be able to identify the lack of escalation in the audio data when analyzing audio data of gun shots.

The ability of the monitoring system 208 to identify gun shots may be augmented by the video analytics engine 214. The video analytics engine 214 may be able to identify people standing in positions that typically indicate shooting a gun as well as identifying objected in the video data that may resemble guns. The monitoring system 208 may use a combination of determinations from the audio analytics engine 220 and the video analytics engine 214 to identify likely gun shots.

In some implementations, the audio analytics engine 220 may receive audio data from multiple sources around the property. For example, there may be a microphone in the kitchen, another in the living room, and another at the front door. The audio analytics engine 220 may use triangulation to determine the location of the source of a sound such as a gun shot, glass breaking, a person who fell, or any other similar event. The audio analytics engine 220 may use a combination of time delays and decibel attenuation to determine the location of the source of a sound. The audio analytics engine 220 may be able to access a floor plan of the property. Using the floor plan, the audio analytics engine 220 may identify how sound will likely reflect off and/or be blocked by walls and use this information as part of the triangulation calculation.

In some implementations, the audio analytics engine 220 may be customized for the unique acoustical aspects of the property. The audio analytics engine 220 may be trained using known locations of audio sources. For example, the resident may move around the house with a mobile device. The monitoring system 208 may instruct the resident to stand in a certain place. The resident may confirm that the resident is at the requested location. At that time, the monitoring system 208 may instruct the mobile device to play a certain sound. This may repeat for several locations in the property. The microphones of the property may detect the audio from the mobile device and use the known location of the mobile device to train the triangulation model. The audio analytics engine 220 may use the model to determine likely locations of sounds detected by the microphones.

Figure 3:
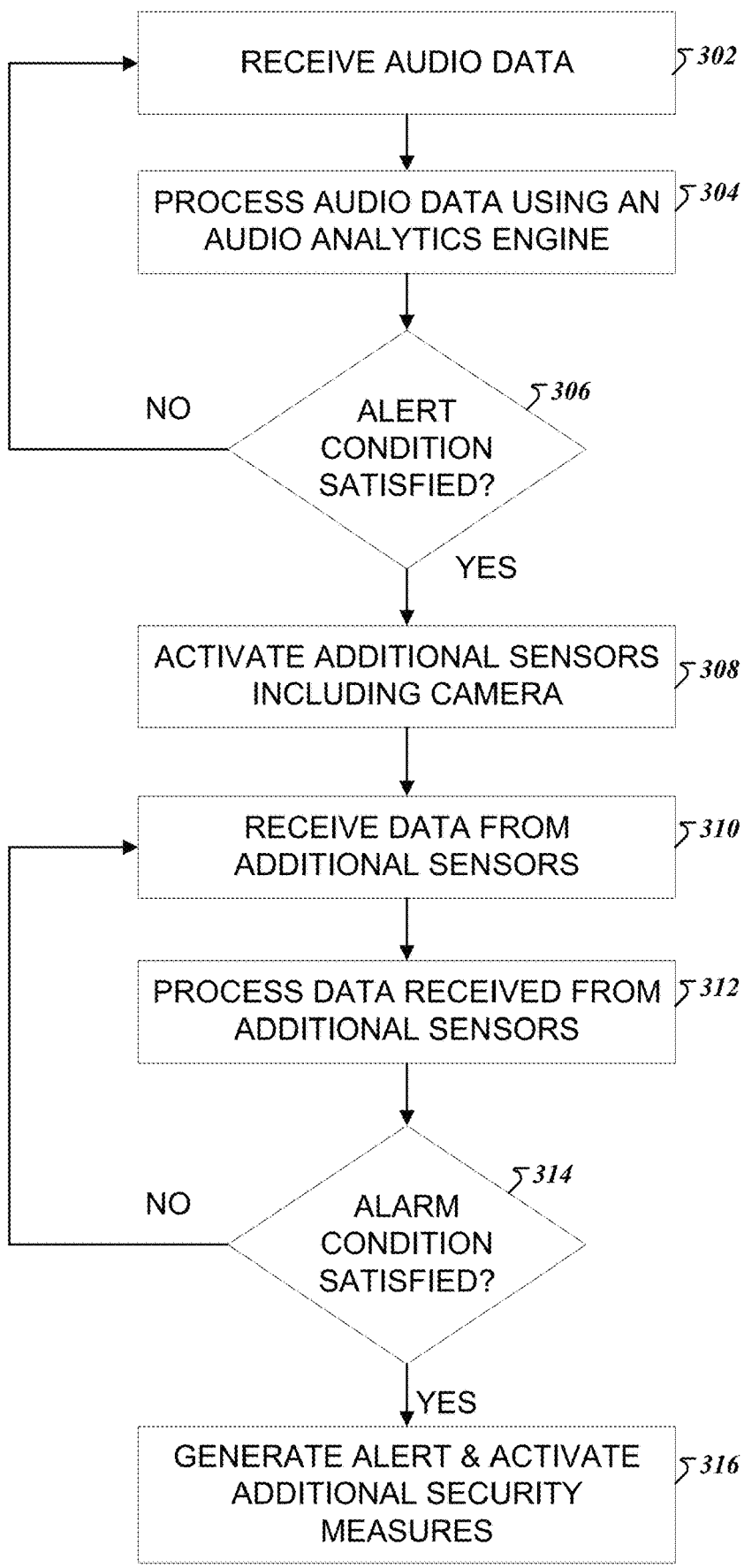
FIG. 3 depicts an example flowchart in which audio data triggers additional event monitoring mechanisms.

FIG. 3 depicts an example flowchart in which audio data triggers additional event monitoring mechanisms. The steps illustrated in FIG. 3 may be executed by the analytics processor 212 described with reference to FIG. 2 or a system that incorporates the analytics processor. Initially, the system receives audio data from one or more audio sensors such as a microphone (302). The system processes the received audio data using an audio analytics engine as described above with reference to FIG. 2 (304). For example, audio data is processed to determine if one or more of a discrete decibel threshold, an average threshold, and an escalation threshold have been satisfied. The audio data may also be processed to determine if any audio pattern is contained within the received audio data.

For example, an audio sensor may detect the sound of a glass window breaking. The signal received from the audio sensor may be received by the audio analytics engine, and the discrete decibel threshold classifier may determine that a discrete decibel threshold has been satisfied by the sound of the broken window.

As another example, an audio sensor may detect the sound of car alarm from a car located in the garage of a home. If the sound of the car alarm does not subside over a period of time, the average threshold classifier in the audio analytics engine may determine that the average threshold has been satisfied over a period of time.

As another example, an audio sensor may detect the sound of two people arguing. If the argument begins to escalate and the two people begin to shout at each other, the escalation classifier in the audio analytics engine may determine that the escalation threshold has been satisfied over a period of time.

As another example, an audio sensor may detect the sound of a dog barking. The audio pattern classifier in the audio analytics engine may determine that the received audio signal corresponds to the sound of a dog barking.

If one or more of a discrete decibel threshold, an average threshold, and an escalation threshold have been satisfied or an audio pattern is contained within the received audio data, the system may determine if an alert condition is satisfied (306). The satisfaction of the alert condition may depend on a set of rules that determine when an alert condition is satisfied. In general, when a discrete decibel threshold, an average threshold, and an escalation threshold have been satisfied and the audio signal does not include data that has been determined by the system to be safe, an alert condition may be satisfied. For instance, in the examples noted above, a dog barking may exceed a discrete decibel threshold but may also correspond to an audio pattern that is deemed safe. Therefore, an alert condition is not satisfied. However, if other sounds such as a window breaking or a car alarm are detected, satisfy at least one of the discrete decibel threshold, the average threshold, and the escalation threshold, and do not correspond to data determined to be safe, the alert condition is satisfied.

When an alert condition is not satisfied, the system returns to the operation of receiving audio data (302). When an alert condition is satisfied, the system may optionally activate additional sensors including a visual sensor such as camera (308). The received audio data is thus used to trigger the activation of additional sensors upon the satisfaction of an alert condition.

The system may receive supplemental data from the additional sensors (310) which is then further processed (312). For example, a video feed or an image obtained by the additional sensors may be processed for object or visual pattern detection, as described above. The object detector may provide an image of the conditions associated with the noise or audio signal detected by the audio sensors. For example, a video feed may contain images of a thief breaking into a building, a homeowner tripping and falling, lighting striking a building, an object falling or being thrown into the building. As such, the image data provides additional contextual data for the alert condition.

Using the audio data complemented with data from the additional sensors, the system utilizes a set of rules to determine if alarm condition is satisfied (314). For instance, in the examples noted above, if a homeowner, whose image ID may be stored in the system, is included in the image data and is likely the cause of a noise, the alarm condition is not satisfied. In contrast, if the images depict a thief or thrown object being the cause of an alert condition, the alarm condition may be satisfied. In general, the alarm condition rules may be programmed by a monitoring system administrator or may be configured by neural networks based on user preferences and interactions with the system.

When an alarm condition is not satisfied, the system returns to the operation of receiving supplemental data from additional sensors (310). When an alarm condition is satisfied, the system will generate one or more alert messages and transmit the alert messages to a user who is associated with the property for which the alert condition is generated for and a system administrator, as described above (316).

In addition, the system may activate one or more additional security measures for the property for which the alert condition is generated. The additional security measures may include one or more actions including, but not limited to, sending a security associate to the property, locking down a facility or room at the property, sending a drone to the property for additional monitoring, activating systems such as locks, water sprinklers, fire extinguishers, and turning the electrical power at the property on or off. In some implementations, the additional security measures may include activating additional sensors and resources and identifying a likely location of the source of the alarm condition. The additional security measures and alarm condition may continue until a user or system administrator terminates the additional security measures and alarm condition.

Figure 4:
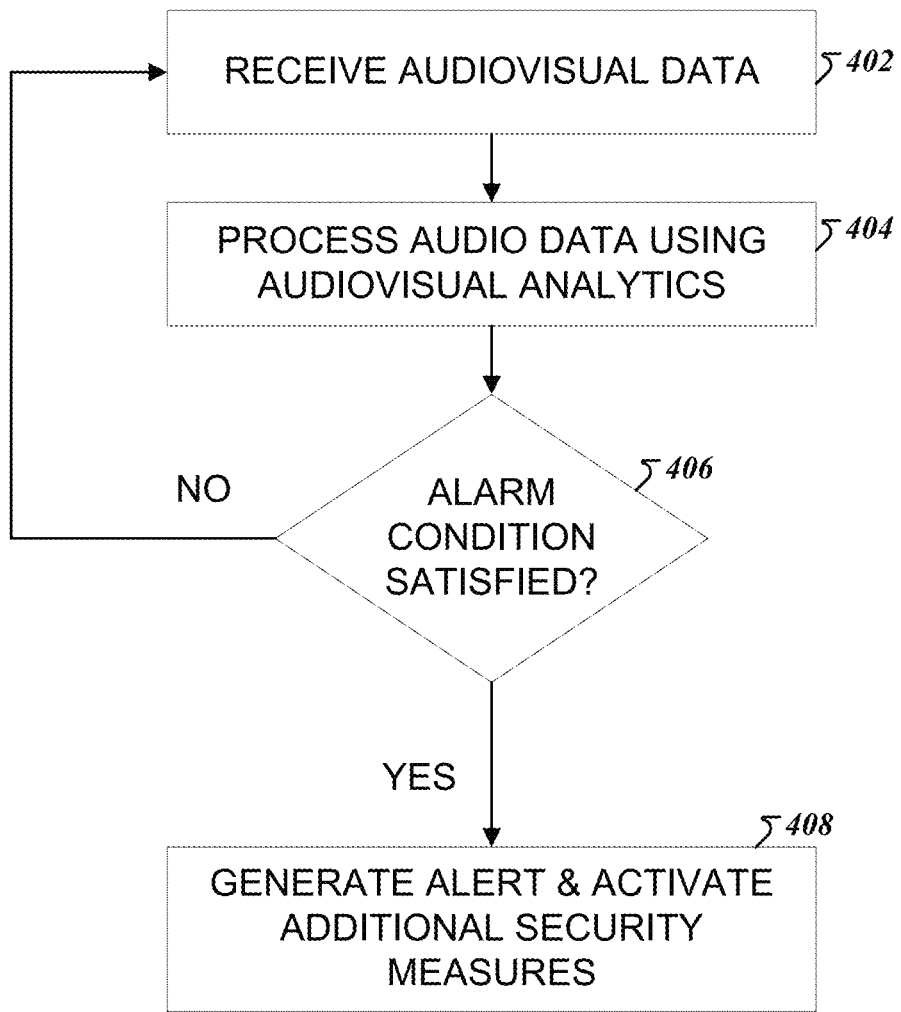
FIG. 4 depicts an example flowchart in which audiovisual data is utilized for event monitoring.

While FIG. 3 describes an example in which audio data is used to trigger additional data such as visual data for monitoring security events, audio data is not required to trigger additional event monitoring mechanisms. FIG. 4 depicts an example flowchart in which audiovisual data is utilized for event monitoring. In FIG. 4, audiovisual data may be received at the same time from audio sensors and visual sensors, as in operations 302 and 310 (402). The received data may be processed using audiovisual analytics as described above in operations 304 and 312 (404). Using alarm and alert condition rules, the system may then determine whether an alarm condition is satisfied, as described above in operations 306 and 314 (406). The system may then generate an alert message and activate additional security measures, as described above in operation 316.

The methods in FIGS. 3 and 4 both offer advantages. In the method of FIG. 3, audio data from audio sensors are used to trigger other sensors such as visual sensors, which then provide additional contextual information. This method can be particularly useful because it utilizes less system resources. For example, the amount of data that is received and processed is significantly less than the data utilized by systems that rely on visual data and images. Additionally, the processing of data to determine if an alarm condition or potential security event exists can be significantly faster due to the smaller amount of data that needs to be processed and audio signal processing techniques that can identify potential security and safety hazards with reliability and accuracy.

In the method of FIG. 4, audiovisual data is collected simultaneously. No audio trigger is utilized so sound and image data may be obtained at the same time. In this method, the system may obtain data that triggers an alert and contextual data at the same time. The system may thus be able to determine whether an alarm condition exists without having to wait for additional data.

Figure 5:
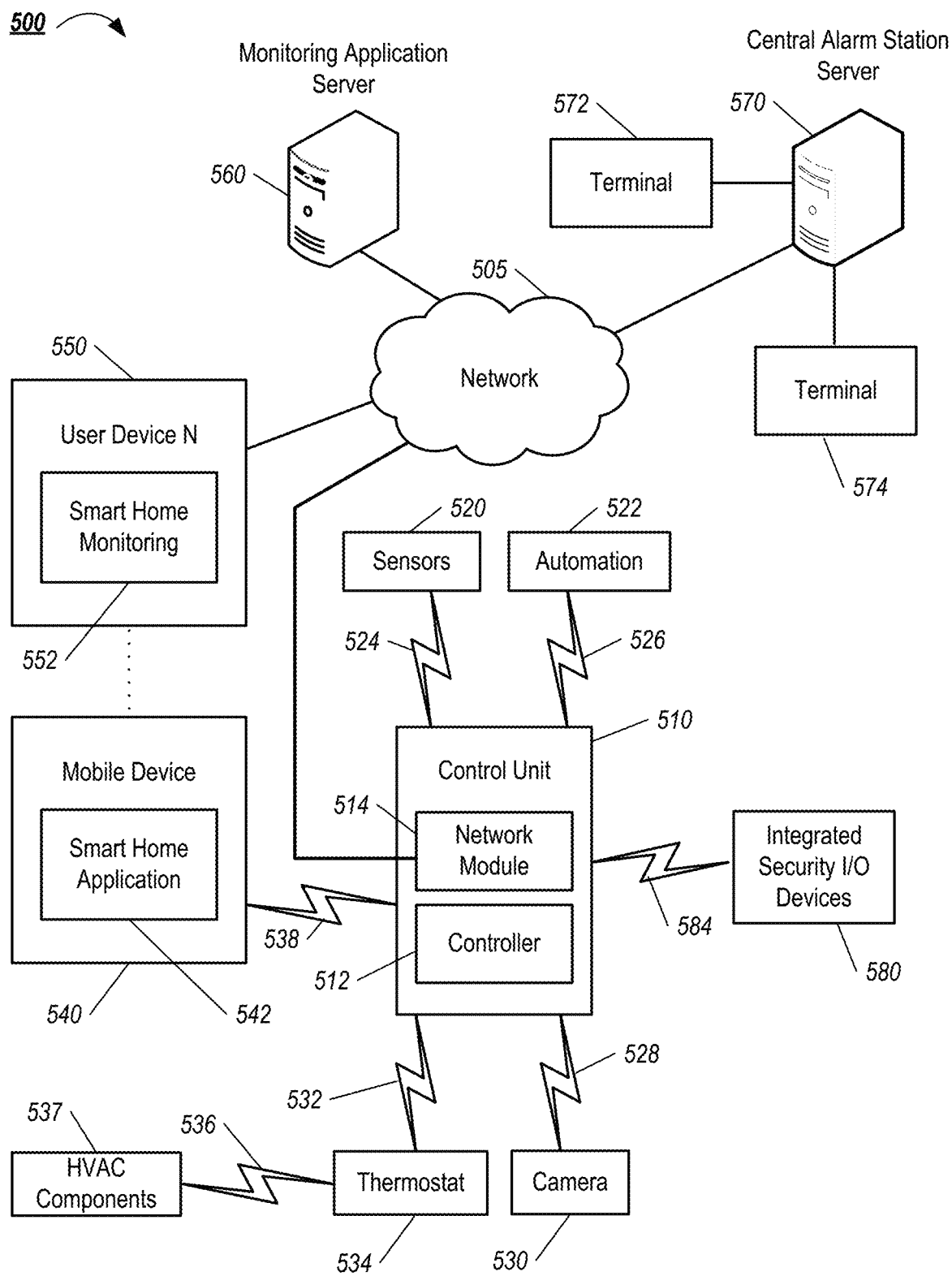
FIG. 5 is a block diagram of an example security monitoring system.

Embodiments and all of the functional operations and/or actions described in this specification may be implemented in the example security monitoring system 500 shown in FIG. 5. The electronic system 500 includes a network 505, a control unit 510, one or more user devices 540 and 550, a monitoring application server 560, and a central alarm station server 570. In some examples, the network 505 facilitates communications between the control unit 510, the one or more user devices 540 and 550, the monitoring application server 560, and the central alarm station server 570.

The network 505 is configured to enable exchange of electronic communications between devices connected to the network 505. For example, the network 505 may be configured to enable exchange of electronic communications, such as power consumption data, event detection data, security or safety alert reports, signal power data, between the control unit 510, the one or more user devices 540 and 550, the monitoring application server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor, such as the analytics processor described above, or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, blinds, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voiceband modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include an optical sensor, an audio sensor, a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 520 may include a radio-frequency identification (RFID) sensor that identifies a particular article that includes a pre-assigned RFID tag. In some cases, the sensors 520 may communicate directly or indirectly with one or more devices in network 505.

The control unit 510 communicates with the module 522 and the camera 530 to perform monitoring. The module 522 is connected to one or more devices that enable home automation control. For instance, the module 522 may be connected to one or more lighting systems and may be configured to control operation of the one or more lighting systems. Also, the module 522 may be connected to one or more electronic locks at a property and may be configured to control operation of the one or more electronic locks (e.g., control Z-Wave locks using wireless communications in the Z-Wave protocol. Further, the module 522 may include multiple modules that are each specific to the type of device being controlled in an automated manner. The module 522 may control the one or more devices based on commands received from the control unit 510. For instance, the module 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of a smart meter, a voltage sensor, or in general, any area within a building or within a residential facility 102-A monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the module 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring application server 560 or a processing server over the Internet. In these implementations, image data captured by the camera 530 does not pass through the control unit 510 and the camera 530 receives commands related to operation from the monitoring application server 560.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534.

A module 537 is connected to one or more components of an HVAC system associated with a property, and is configured to control operation of the one or more components of the HVAC system. In some implementations, the module 537 may be connected to the internal power grid of the property and also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices. The robotic devices may be any type of robots that are capable of moving and taking actions that assist in security monitoring. For example, the robotic devices may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the system 500 for use in appropriate circumstances. For instance, a robotic vacuum cleaner device may be associated with the monitoring system 500 as one of the robotic devices and may be controlled to take action responsive to monitoring system events.

In some examples, the robotic devices automatically navigate within a property. In these examples, the robotic devices include sensors and control processors that guide movement of the robotic devices within the property. For instance, the robotic devices may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices may store data that describes attributes of the property. For instance, the robotic devices may store a floorplan and/or a three-dimensional model of the property that enables the robotic devices to navigate the property. During initial configuration, the robotic devices may receive the data describing attributes of the property, determine a frame of reference to the data (e.g., a home or reference location in the property), and navigate the property based on the frame of reference and the data describing attributes of the property. Further, initial configuration of the robotic devices also may include learning of one or more navigation patterns in which a user provides input to control the robotic devices to perform a specific navigation action (e.g., fly to an upstairs bedroom and spin around while capturing video and then return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, and/or any type of output devices that allow the robotic devices to communicate information to a nearby user.

The robotic devices also may include a communication module that enables the robotic devices to communicate with the control unit 510, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 900 MHz wireless communication module that enables the robotic devices to communicate directly with the control unit 510. Other types of short-range wireless communication protocols, such as Bluetooth, Bluetooth LE, Zwave, Zigbee, etc., may be used to allow the robotic devices to communicate with other devices in the property.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predefined home base or reference locations in the property. The robotic devices may be configured to navigate to the charging stations after completion of tasks needed to be performed for the monitoring system 500. For instance, after completion of a monitoring operation or upon instruction by the control unit 510, the robotic devices may be configured to automatically fly to and land on one of the charging stations. In this regard, the robotic devices may automatically maintain a fully charged battery in a state in which the robotic devices are ready for use by the monitoring system 500.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device may always use a first charging station and a second robotic device may always use a second charging station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use. For instance, when one of the robotic devices has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices. Additionally, the one or more control units 510 may receive one or more sensor data from the sensors 520 and determine whether to provide an alert to the one or more integrated security input/output devices 580.

The sensors 520, the module 522, the camera 530, the thermostat 534, and the integrated security devices 580 communicate with the controller 512 over communication links 524, 526, 528, 532, 584, and 586. The communication links 524, 526, 528, 532, 584, and 586 may be a wired or wireless data pathway configured to transmit signals from the sensors 520, the module 522, the camera 530, the thermostat 534, and the integrated security devices 580 to the controller 512. The sensors 520, the module 522, the camera 530, the thermostat 534, and the integrated security devices 580 may continuously transmit sensed values to the controller 512, periodically transmit sensed values to the controller 512, or transmit sensed values to the controller 512 in response to a change in a sensed value. For example, in some cases, the sensors 520 may include voltage sensors and may transmit sensed voltage data to the controller 512.

The communication links 524, 526, 528, 532, 584, and 586 may include a local network. The sensors 520, the module 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 560 or processing server is an electronic device configured to provide monitoring services by exchanging electronic communications with the control unit 510, the one or more user devices 540 and 550, and the central alarm station server 570 over the network 505. For example, the monitoring application server 560 may be configured to monitor events (e.g., alarm events) determined by the control unit 510. In this example, the monitoring application server 560 may exchange electronic communications with the network module 514 included in the control unit 510 to receive information regarding events detected by the control unit server 104*a*. The monitoring application server 560 also may receive information regarding events from the one or more user devices 540 and 550.

In some examples, the monitoring application server 560 may route alert data received from the network module 514 or the one or more user devices 540 and 550 to the central alarm station server 570. For example, the monitoring application server 560 may transmit the alert data to the central alarm station server 570 over the network 505.

The monitoring application server 560 may store sensor and image data received from the monitoring system and perform analysis of sensor and image data received from the monitoring system. Based on the analysis, the monitoring application server 560 may communicate with and control aspects of the control unit 510 or the one or more user devices 540 and 550.

The central alarm station server 570 is an electronic device configured to provide alarm monitoring service by exchanging communications with the control unit 510, the one or more mobile devices 540 and 550, and the monitoring application server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring application server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. The one or more user devices 540 and 550 are devices that host and display user interfaces. For instance, the user device 540 is a mobile device that hosts one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system. The smart home application 542 may allow a user to view alert messages and reports generated for security events.

The user device 550 may be a general-purpose computer (e.g., a desktop personal computer, a workstation, or a laptop computer) that is configured to communicate with the monitoring application server 560 and/or the control unit 510 over the network 505. The user device 550 may be configured to display a smart home user interface 552 that is generated by the user device 550 or generated by the monitoring application server 560. For example, the user device 550 may be configured to display a user interface (e.g., a web page) provided by the monitoring application server 560 that enables a user to perceive images captured by the camera 530 and/or reports related to the monitoring system.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Zwave, Zigbee, HomePlug (ethernet over powerline), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring application server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring application server 560 may relay data received from the control unit 510 to the one or more user devices 540 and 550 through the network 505. In this regard, the monitoring application server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring application server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring application server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 only includes the one or more user devices 540 and 550, the sensors 520, the module 522, the camera 530, and the robotic devices. The one or more user devices 540 and 550 receive data directly from the sensors 520, the module 522, the camera 530, and the robotic devices and sends data directly to the sensors 520, the module 522, the camera 530, and the robotic devices. The one or more user devices 540, 550 provide the appropriate interfaces/processing to provide visual surveillance and reporting.

In other implementations, the system 500 further includes network 505 and the sensors 520, the module 522, the camera 530, the thermostat 534, and the robotic devices are configured to communicate sensor and image data to the one or more user devices 540 and 550 over network 505 (e.g., the Internet, cellular network, etc.). In yet another implementation, the sensors 520, the module 522, the camera 530, the thermostat 534, and the robotic devices (or a component, such as a bridge/router) are intelligent enough to change the communication pathway from a direct local pathway when the one or more user devices 540 and 550 are in close physical proximity to the sensors 520, the module 522, the camera 530, the thermostat 534, and the robotic devices to a pathway over network 505 when the one or more user devices 540 and 550 are farther from the sensors 520, the module 522, the camera 530, the thermostat 534, and the robotic devices. In some examples, the system leverages GPS information from the one or more user devices 540 and 550 to determine whether the one or more user devices 540 and 550 are close enough to the sensors 520, the module 522, the camera 530, the thermostat 534, and the robotic devices to use the direct local pathway or whether the one or more user devices 540 and 550 are far enough from the sensors 520, the module 522, the camera 530, the thermostat 534, and the robotic devices that the pathway over network 505 is required. In other examples, the system leverages status communications (e.g., pinging) between the one or more user devices 540 and 550 and the sensors 520, the module 522, the camera 530, the thermostat 534, and the robotic devices to determine whether communication using the direct local pathway is possible. If communication using the direct local pathway is possible, the one or more user devices 540 and 550 communicate with the sensors 520, the module 522, the camera 530, the thermostat 534, and the robotic devices using the direct local pathway. If communication using the direct local pathway is not possible, the one or more user devices 540 and 550 communicate with the sensors 520, the module 522, the camera 530, the thermostat 534, and the robotic devices using the pathway over network 505.

In some implementations, the system 500 provides end users with access to images captured by the camera 530 to aid in decision-making. The system 500 may transmit the images captured by the camera 530 over a wireless WAN network to the user devices 540 and 550. Because transmission over a wireless WAN network may be relatively expensive, the system 500 uses several techniques to reduce costs while providing access to significant levels of useful visual information.

In some implementations, a state of the monitoring system and other events sensed by the monitoring system may be used to enable/disable video/image recording devices (e.g., the camera 530). In these implementations, the camera 530 may be set to capture images on a periodic basis when the monitoring system is armed in an "Away" state, but set not to capture images when the monitoring system is armed in a "Stay" state or disarmed. In addition, the camera 530 may be triggered to begin capturing images when the monitoring system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may in some cases be excised from the combination, and the claimed combination may be directed to a sub-combination or variation of a sub-combination.

Similarly, the separation of various system components in the embodiments described above should not be understood as requiring such separation in all embodiments, and it should be understood that the described program components and systems may generally be integrated together in a single software product or packaged into multiple software products. For example, although some operations are described as being performed by a processing server, one of more of the operations may be performed by the smart meter or other network components.

It should be understood that the phrase one or more of and the phrase at least one of include any combination of elements. For example, the phrase one or more of A and B includes A, B, or both A and B. Similarly, the phrase at least one of A and B includes A, B, or both A and B.

Thus, particular implementations have been described. Other implementations are within the scope of the following claims. For example, the actions recited in the claims may be performed in a different order and still achieve desirable results.

What is claimed is:

1. A computer-implemented method to monitor a property, comprising:
   receiving audio data from a sensor of a monitoring system without receiving video data from the monitoring system;
   determining (i) whether an alert condition is satisfied based on the received audio data, and (ii) a location associated with the alert condition based on time delay and attenuation of audio signals in the received audio data;
   in response to determining that the alert condition is satisfied based on the received audio data:
   activating a video camera of the monitoring system to obtain video data;
   receiving the video data from the video camera;
   determining, based on the received video data, whether a security event associated with the alert condition at the location associated with the alert condition exists; and
   in response to determining that the security event associated with the alert condition exists, performing a monitoring system action.

2. The computer-implemented method of claim 1, wherein performing the monitoring system action comprises at least one of:
   generating instructions to request a security associate to be sent to the property;
   locking the property or a room in the property;
   sending a drone to the property;
   activating one or more systems comprising a lock system, a water sprinkler system, and a fire extinguishing system; or
   controlling electrical power at the property to be turned on or off.

3. The computer-implemented method of claim 1, wherein determining whether the alert condition is satisfied based on the audio data comprises:
   at least one of:
   determining whether at least one of a discrete decibel threshold, an average threshold, and an escalation threshold have been satisfied; or
   determining whether an audio pattern exists in the audio data; and
   determining that the alert condition is satisfied in response to determining that:
   at least one of the discrete decibel threshold, the average threshold, and the escalation threshold has been satisfied; or
   an audio pattern exists in the audio data.

4. The computer-implemented method of claim 3, wherein determining that the alert condition is satisfied comprises determining that the audio data does not include data indicative of a safe condition.

5. The computer-implemented method of claim 1, wherein determining, based on the video data, whether the security event associated with the alert condition exists comprises:
   obtaining an image of conditions associated with the audio data received from the sensor; and
   determining, using a set of rules, that a combination of the image and the audio data corresponds to the security event.

6. The computer-implemented method of claim 5, wherein the set of rules is configured by a neural network that is trained based on user preferences and interactions.

7. The computer-implemented method of claim 1, comprising:
   in response to determining that the alert condition is satisfied:
   activating one or more of thermometers, motion sensors, humidity and climate sensors; and
   obtaining contextual data from the one or more of thermometers, motion sensors, humidity and climate sensors, the contextual data providing contextual information associated with the alert condition.

8. A monitoring system to monitor a property comprising:
   a sensor to detect audio signals and transmit audio data corresponding to the audio signals to a processor; and
   the processor configured to:
   receive audio data from a sensor of a monitoring system without receiving video data from the monitoring system;
   determine (i) whether an alert condition is satisfied based on the received audio data, and (ii) a location associated with the alert condition based on time delay and attenuation of audio signals in received the audio data;
   in response to determining that the alert condition is satisfied based on the received audio data:
   activate a video camera of the monitoring system to obtain video data;
   receive the video data from the video camera;
   determine, based on the video received data, whether a security event associated with the alert condition at the location associated with the alert condition exists; and
   in response to determining that the security event associated with the alert condition exists, perform a monitoring system action.

9. The monitoring system of claim 8, wherein the processor being configured to perform the monitoring system action comprises the processor being configured to:
   generate instructions to request a security associate to be sent to the property;
   lock the property or a room in the property;
   send a drone to the property;
   activate one or more systems comprising a lock system, a water sprinkler system, and a fire extinguishing system; or
   control electrical power at the property to be turned on or off.

10. The monitoring system of claim 8, wherein the processor being configured to determine whether the alert condition is satisfied based on the audio data comprises the processor being configured to:
    determine at least one of:

whether at least one of a discrete decibel threshold, an average threshold, and an escalation threshold have been satisfied; or whether an audio pattern exists in the audio data; and determine that the alert condition is satisfied in response to determining that:

at least one of the discrete decibel threshold, the average threshold, and the escalation threshold has been satisfied; or an audio pattern exists in the audio data.

11. The monitoring system of claim 10, wherein the processor being configured to determine that the alert condition is satisfied comprises the processor being configured to determine that the audio data does not include data indicative of a safe condition.

12. The monitoring system of claim 8, wherein the processor being configured to determine, based on the video data, whether the security event associated with the alert condition exists comprises the processor being configured to:

obtain an image of conditions associated with the audio data received from the sensor; and determine, using a set of rules, that a combination of the image and the audio data corresponds to the security event.

13. The monitoring system of claim 12, wherein the set of rules is configured by a neural network that is trained based on user preferences and interactions.

14. The monitoring system of claim 8, wherein the processor is configured to:

in response to determining that the alert condition is satisfied:

activate one or more of thermometers, motion sensors, humidity and climate sensors; and obtain contextual data from the one or more of thermometers, motion sensors, humidity and climate sensors, the contextual data providing contextual information associated with the alert condition.

15. A non-transitory computer-readable storage medium including instructions that, when executed by a processor, cause the processor to perform operations comprising:

receiving audio data from a sensor of a monitoring system without receiving video data from the monitoring system;

determining (i) whether an alert condition is satisfied based on the received audio data, and (ii) a location associated with the alert condition based on time delay and attenuation of audio signals in the received audio data;

in response to determining that the alert condition is satisfied based on the received audio data:

activating a video camera of the monitoring system to obtain video data;

receiving the video data from the video camera;

determining, based on the received video data, whether a security event associated with the alert condition at the location associated with the alert condition exists; and in response to determining that the security event associated with the alert condition exists, performing a monitoring system action.

16. The non-transitory computer-readable storage medium of claim 15, wherein performing the monitoring system action comprises at least one of:

generating instructions to request a security associate to be sent to a property monitored by the monitoring system;

locking the property or a room in the property;

sending a drone to the property;

activating one or more systems comprising a lock system, a water sprinkler system, and a fire extinguishing system; or controlling electrical power at the property to be turned on or off.

17. The non-transitory computer-readable storage medium of claim 15, wherein determining whether the alert condition is satisfied based on the audio data comprises:

at least one of:

determining whether at least one of a discrete decibel threshold, an average threshold, and an escalation threshold have been satisfied; or determining whether an audio pattern exists in the audio data; and determining that the alert condition is satisfied in response to determining that:

at least one of the discrete decibel threshold, the average threshold, and the escalation threshold has been satisfied; or an audio pattern exists in the audio data.

18. The non-transitory computer-readable storage medium of claim 17, wherein determining that the alert condition is satisfied comprises determining that the audio data does not include data indicative of a safe condition.

19. The non-transitory computer-readable storage medium of claim 15, wherein determining, based on the video data, whether the security event associated with the alert condition exists comprises:

obtaining an image of conditions associated with the audio data received from the sensor; and determining, using a set of rules, that a combination of the image and the audio data corresponds to the security event.

20. The non-transitory computer-readable storage medium of claim 15, wherein the operations comprise:

in response to determining that the alert condition is satisfied:

activating one or more of thermometers, motion sensors, humidity and climate sensors; and obtaining contextual data from the one or more of thermometers, motion sensors, humidity and climate sensors, the contextual data providing contextual information associated with the alert condition.

* * * * *